Oct. 2, 1951      M. A. MOSKOVITZ      2,569,823
SELF-LUBRICATED STEERING KNUCKLE JOINT
Filed July 16, 1947
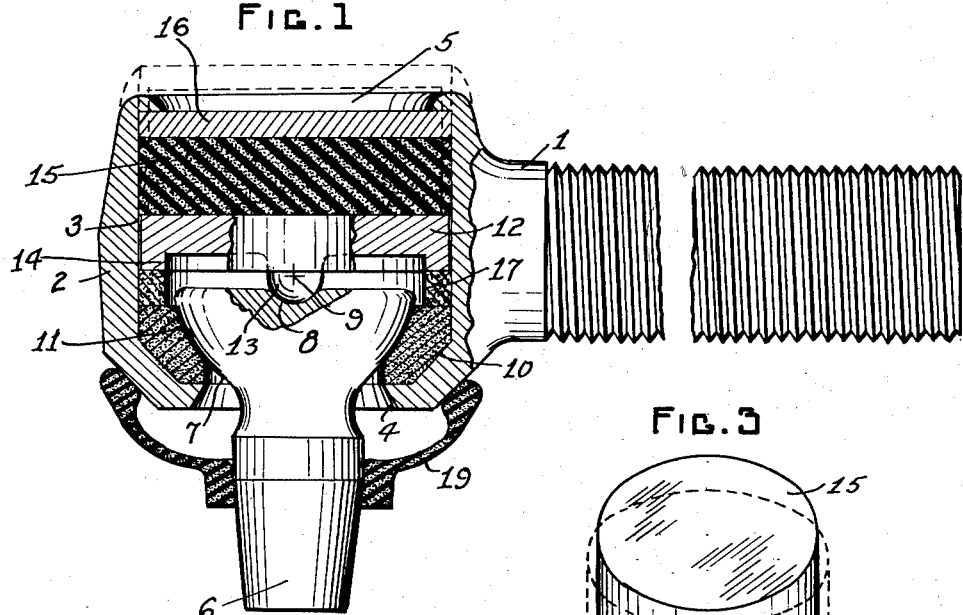
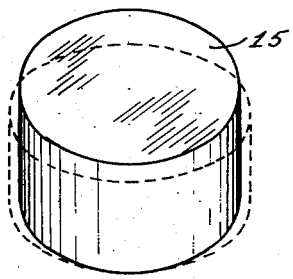
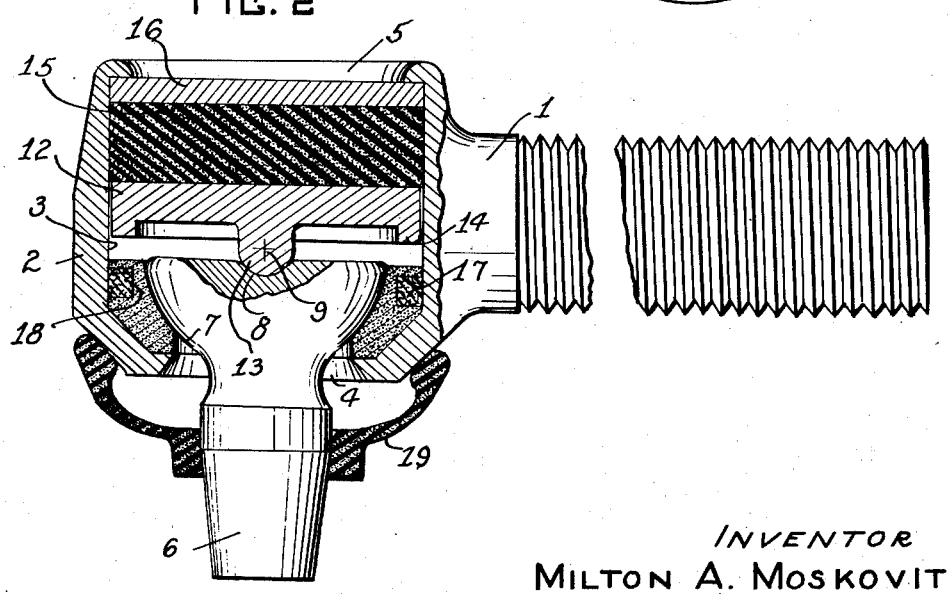
INVENTOR
MILTON A. MOSKOVITZ
BY: Ben V. Zillman
ATTORNEY Patented Oct. 2, 1951

2,569,823

UNITED STATES PATENT OFFICE 2,569,823

SELF-LUBRICATED STEERING KNUCKLE JOINT

Milton A. Moskovitz, Fairfield, Ill.

Application July 16, 1947, Serial No. 761,352

4 Claims. (Cl. 287—90)

This invention relates to improvements in joints, but more specifically to ball and socket joints such as are customarily used for steering knuckles and the like, and has among its objects the construction of such a joint that will be self-lubricating, relatively inexpensive to make and maintain, neat in appearance, long-lasting, safe, and which will be otherwise satisfactory for use wherever deemed applicable.

One of the important objects of this invention is to so construct a joint of the kind described, that it will be self-lubricating, properly and consistently, for an extremely long period of use.

Another important object of my invention is to so construct such a joint, with a porous bronze bushing to engage the steel ball head to form an excellent anti-friction bearing surface therebetween, and wherein the amount of wear in service will be minimized.

A further object of my invention is to provide, in a ball and socket joint of this kind, a rubber-like element which is held compressed in place within the socket and to thereafter exert its force to maintain the ball seated in said bushing with a firm and gentle, but constant pressure, this element at the same time forming a seal to prevent leakage of lubricant therepast.

An added object of this invention is to so construct the various elements of the ball and socket joint of the kind described, that after the bushing has worn a predetermined amount, no further pressure on said bushing will be had, and thereby preventing the likelihood of the ball head from wearing through the base of the assembled unit, with the consequent disengagement of the parts of the unit in service.

A still further object of my invention is to provide, in a device of the kind hereinbefore mentioned, a bushing of metal and having the characteristic of being porous to permit passage of lubricant therethrough to effectively and sufficiently rapidly transfer the lubricant to the desired wear areas.

Yet another object of my invention is to so construct a unit of the kind described, wherein there will be a rounded member having rotational and swinging movement in a relatively stationary bushing, said rounded member provided with a ball and socket engagement with a pressure-actuated plate to constantly urge said rounded member into its seat in the bushing, the spherical surfaces of the coacting rounded member and bushing and of the ball and socket of the pressure plate and said rounded member having the identical center of curvature.

Many other objects and advantages of the construction herein shown and described will be obvious to those skilled in the art to which this invention appertains, as will be apparent from the disclosures herein given.

To this end, my invention consists in the novel construction, combination of parts and the construction herein shown and described, and as will be more clearly pointed out in the following specification.

In the drawings, wherein like reference characters represent like or corresponding parts throughout the views, Figure 1 is a cross-sectional view, with parts broken away and shown in elevation, showing one form of device;

Figure 2 is a similar view of a modification of the same; and

Figure 3 is a perspective elevation of the resiliently compressible element, in initial and compressed shapes.

Referring more particularly to the drawings, wherein I have illustrated preferred embodiments of my invention, there is shown a pair of cooperably connected members commonly employed in various mechanisms, as for example, as part of the steering linkage of motor vehicle construction. Obviously such a linkage is applicable to other constructions wherein movement is to be transmitted from one element to another through a universal joint connection.

One member 1 of such a pair of cooperating members is indicated as shown, the same having a tubular enlargement 2 at some point of its length, as at the end, to provide a socket 3 therethrough, one end 4 of said socket opening being smaller than the bore 5 at its other extremity.

The second mechanical member 6 of the pair of members is formed with an externally convex, rounded or ball head or end 7, whose diameter is greater than that of the opening 4 so that the member 6 must be inserted through the larger opening 5 as indicated, and when so assembled, the member 6 will not fall through the bottom opening 4.

It will be noted that the upper end or top of said ball head is preferably centrally recessed at 8, and that the center of the curvature of both said convex surface 7 and the concave surface 8 is from the same point 9, for a purpose to be more clearly hereinafter set forth.

A bushing element 10 is fixedly retained within said socket 3 and is provided with a concave seat 11 of the same curvature as that of the convex portion of the head 7 to snugly but slidably engage with the latter and journal the same, so that although the ball member may swing and may rotate relatively of said bushing, the latter is stationary.

In order to minimize wear between said head and bushing, the latter is preferably composed of some anti-friction bearing metal that is relatively softer than the ball head, the latter being usually hardened and then burnished. One such metal that I found very satisfactory for such service, is powdered bronze, pressed into shape. In addition to being long-wearing, such a bushing has the important characteristic of being sufficiently porous to permit oil to penetrate therethrough and thereby transfer such lubricant to all bearing areas and keep them well lubricated.

A pressure plate 12 is longitudinally or axially slidable within said socket opening 3 and engages on its under face with the top of said ball head, so that any pressure downwardly on said plate will be transmitted to force said ball head into its seat in the bushing. The plate 12 is formed with a centrally positioned downwardly projecting rounded or spherical protuberance 13 of a size and shape to snugly seat in the concave recess 8. Obviously, the center of curvature of 13 is identical with the center of curvature of said rounded portions 8 and 7, thereby providing a uniform rotary and swivel action of the rounded head element without actuating said pressure plate. Said plate is also provided with a peripheral flange 14 radially outwardly beyond the ball head to positively clear the latter in operation, in all positions of the same.

A plug element 15, of some resiliently compressible material able to withstand lubricants, is positioned within the socket 3 to act as a source of constant pressure to hold the parts in proper relationship, and I have found that synthetic rubber or other rubber-like material will answer the purpose.

This plug is initially of a diameter somewhat smaller than the inside of said socket into which it is to be placed, and is thicker than the space height to be occupied, the initial shape being indicated in full lines in Fig. 3, while the dotted lines represent its compressed and operative shape. After this plug has been dropped into the socket, and although it may be loose therein at the time, it may be readily compressed to expand laterally to engage the side wall of the socket, as shown. A closure plate or cover 16 may be used to close the socket above said plug, and the rim or edge of the socket member may be peened or swaged inwardly to confine said cover in place for the life of the unit.

Obviously, when said element 15 has been so mounted into place, it will exert its pressure constantly to urge the pressure plate downwardly against the ball head, to firmly seat the latter in the bushing. Also, said plug will seal the upper end of the unit against leakage of lubricant or other material therepast.

In order to properly lubricate the joint and make it self-adjusting and lubricating, an absorbent ring 17, of felt, may be mounted on the bushing, and initially saturated with oil so as to feed to the oil-porous bushing. In the form of the invention shown in Fig. 1, said ring 17 may initially engage the pressure plate, so that as the latter is pressed downwardly, the ring will be correspondingly pressed and will be squeezed to exude its lubricant, which is in turn absorbed by said bushing and conducted between the co-acting journal surfaces of the bushing and the head element.

As wear occurs on the bushing the ball head shifts downwardly within the socket, and the pressure plate moves correspondingly downwardly, urged by pressure of the element 15, but when the felt ring has been completely flattened or compressed it is time to replace the unit, because by that time the bushing will have worn so thin that the ball might drop through the lower end of the unit with continued wear at said parts.

To halt continued wear of said bushing at the proper time, I have provided means on the pressure plate, as for example, the peripheral flange 14 hereinbefore mentioned. As soon as said flange engages against the metal of said bushing or against the fully compressed ring 17, pressure of the resilient plug is ineffective to actuate the pressure plate further toward the ball head element, and it is time to renew and replace the worn unit with a new one.

In the modification indicated in Fig. 2, the parts are constructed substantially similarly to the preceding form, including the initial spacing of the flange 14 from the opposed top portion of the bushing, but in Fig. 2, the bushing is provided with a peripheral groove 18 to receive the felt ring permanently positioned out of contact with the pressure ring. Here too, as soon as the pressure plate engages against the bushing itself, the pressure of the resiliently compressible plug is ineffective to cause further movement of the ball member toward its seat in said bushing, and replacement of the unit is indicated.

A rubber boot 19 may be placed to encircle the shank of the member 6 and is shaped to firmly press against the under surface of the socket or enlargement 2, to hold said parts closed against entry of dirt or other foreign matter, without interfering with the intended universal movement between the pair of connected members.

Having thus described my invention, it is obvious that various immaterial changes and modifications may be made in the same without departing from the spirit of my invention; hence I do not wish to be understood as limiting myself to the exact form, arrangement, construction and combination of parts herein shown and described, or the uses mentioned, except as limited by the state of the art to which this invention appertains, or by the claims as hereunto appended.

What I claim as new and desire to secure by Letters Patent is:

1. In a ball joint, the combination with a pair of movably interconnected members one of which has a ball end and the other of which has a socket to receive said ball, of a bushing in said socket to seat said ball, a pressure plate movable within said socket to engage said ball, lubricant-impregnated means entirely within said socket to communicate with the ball-engaging seat of said bushing and movably engaged by said pressure plate, and a rubber-like plug compressed into said socket and spaced from said ball to constantly exert pressure against the pressure plate and completely seal said socket against lubricant leakage therepast.

2. In a joint of the kind described, the combination with a pair of movably connected members for transmitting movement therebetween, one of said members having a socket and the other member having a rounded head to fit therein, a lubricant-porous bushing in said socket to provide a seat for said head, a movable pressure plate constantly engaging said head and normally spaced from said bushing, a lubricant-carrying ring mounted on said bushing and more readily compressible than the latter, a resiliently compressible plug within said socket beyond said head to constantly exert pressure against said plate to seat said head, and stop means engageable between said bushing and pressure plate to limit pressure movement of said plate after predetermined wear of said bushing and movably compressing said lubricating ring.

3. In a joint of the kind described, the combination with a pair of relatively movably connected members one of which has a rounded head and the other of which has a socket to receive said head, of an oil-absorbent anti-friction bushing to seat said head, a pressure plate within said socket to engage less of said head than is engaged by said bushing, a resilient rubber-like plug compressed within said socket to seal against leakage therepast and exert constant pressure uniformly on said plate, a lubricant-retaining ring engaging said bushing and more readily compressible than the latter, and means to stop further pressure of said plate against said bushing after a predetermined wear of the latter.

4. In a ball and socket joint, a member having a rounded head, a second member having a socket to receive said head therethrough, a bushing within said socket to seat said head, a pressure plate slidable in said socket and having appreciable transverse play therebetween and constantly engaging said head, a resiliently compressible element in said socket and spaced from said head to exert pressure against said plate toward said head and seal against leakage past said plate, and an oil-saturated ring engaging said bushing and compressibly engageable by said plate as the latter is pressed toward said head.

MILTON A. MOSKOVITZ.

REFERENCES CITED

The following references are of record in the file of this patent:

UNITED STATES PATENTS

| Number | Name | Date |
|---|---|---|
| 893,274 | Starrett | July 14, 1908 |
| 1,881,601 | Hufferd et al. | Oct. 11, 1932 |
| 1,957,781 | Hufferd | May 8, 1934 |
| 2,115,087 | Schaefer | Apr. 26, 1938 |
| 2,291,161 | Katcher | July 28, 1942 |
| 2,292,676 | Thiry | Aug. 11, 1942 |
| 2,442,601 | House et al. | June 1, 1948 |

FOREIGN PATENTS

| Number | Country | Date |
|---|---|---|
| 661,986 | Germany | of 1938 |